(12) United States Patent
Stoutenborough et al.

(10) Patent No.: US 8,975,499 B1
(45) Date of Patent: Mar. 10, 2015

(54) WIND INSTRUMENT TRAINING DEVICE

(71) Applicants: Chris Stoutenborough, Alhambra, CA (US); Zach Conrad, Denver, CO (US)

(72) Inventors: Chris Stoutenborough, Alhambra, CA (US); Zach Conrad, Denver, CO (US)

( * ) Notice: Subject to any disclaimer, the term of this patent is extended or adjusted under 35 U.S.C. 154(b) by 68 days.

(21) Appl. No.: 13/975,302

(22) Filed: Aug. 24, 2013

(51) Int. Cl.
*G09B 15/00* (2006.01)
*G09B 9/00* (2006.01)
*G10D 9/00* (2006.01)
*G09B 15/06* (2006.01)

(52) U.S. Cl.
CPC  *G09B 15/00* (2013.01); *G09B 9/00* (2013.01); *G10D 9/00* (2013.01); *G09B 15/06* (2013.01)
USPC ........................................................ 84/465

(58) Field of Classification Search
CPC .................................. G10D 9/00; G09B 15/06
See application file for complete search history.

(56) References Cited

U.S. PATENT DOCUMENTS

| | | | | |
|---|---|---|---|---|
| 2,556,535 | A * | 6/1951 | Hansen | 84/382 |
| 3,191,481 | A * | 6/1965 | Miller | 84/380 R |
| 3,659,489 | A * | 5/1972 | Vale | 84/465 |
| 4,120,228 | A * | 10/1978 | Windows, Jr. | 84/453 |
| 4,245,544 | A * | 1/1981 | Holland | 84/465 |
| 4,345,503 | A * | 8/1982 | Runyon | 84/383 R |
| 4,378,724 | A * | 4/1983 | Lamart | 84/465 |
| 4,909,123 | A * | 3/1990 | Butenschon, III | 84/382 |
| 6,080,924 | A * | 6/2000 | Cowen et al. | 84/453 |
| 6,570,077 | B1 * | 5/2003 | Goss | 84/477 R |
| 6,768,045 | B1 * | 7/2004 | Ellis | 84/465 |
| 7,465,864 | B2 * | 12/2008 | Heintz | 84/470 R |
| 8,686,267 | B2 * | 4/2014 | Takahashi | 84/465 |
| 8,697,971 | B1 * | 4/2014 | Williams | 84/465 |
| 2009/0188375 | A1 * | 7/2009 | Jancic | 84/465 |

FOREIGN PATENT DOCUMENTS

DE  10056906 A1 * 5/2002
SE  201350314 A1 * 9/2014

* cited by examiner

*Primary Examiner* — Robert W Horn
(74) *Attorney, Agent, or Firm* — Dan Shifrin

(57) ABSTRACT

A wind instrument training device is provided having a housing with a mouthpiece opening in one end and an air exit opening in an opposite end. The device also has two sliding members movable within the housing, each having an air passage and each extending through opposite side openings in the housing. The sliding members are connectable to each other by a biasing means. When the training device is inserted in a wind player's mouth with the sliding members placed against the sides of the player's mouth, air blown from the player's mouth is prevented from flowing through the device. When the wind player tightens muscles against the sliding members, the sliding members move inward and air blown from the player's mouth flows through the mouthpiece opening, the air passages, and the air exit opening.

7 Claims, 7 Drawing Sheets

WIND INSTRUMENT TRAINING DEVICE

TECHNICAL FIELD

The present invention relates generally to wind instruments and, in particular, to training muscles of the mouth of a wind instrument musician.

BACKGROUND ART

When a musician plays a wind instrument, such as a clarinet (woodwind) or trumpet (brass), the musician blows air from his or her mouth across one or two reeds and through the instrument. In simplified terms, the air moving across the aareed causes the reed to vibrate and the frequency of the resulting sound is established by the musician covering and uncovering holes in the body of the instrument.

In order for the reed to vibrate in the correct manner, the musician's mouth and tongue must be in proper positions. However, as air is blown from the mouth into the instrument, the mouth tends to distort, causing an improper airflow. Distortion may be described as the corners of the mouth moving further from the mouthpiece. Two muscles that are involved are the orbicularis orbis, a muscle that encircles the mouth, and the buccinators, a muscle in the cheeks. Strengthening these muscles is important for proper mouth position (embouchure or ambature) and to reduce distortion. And, while wind musicians may attempt to practice proper mouth position, it may be very difficult to know when the two muscles are being used, and even more difficult to know when they are being used in the proper manner.

SUMMARY OF THE INVENTION

A wind instrument training device is provided, comprising a housing having a mouthpiece opening in one end, an air exit opening in an opposite end aligned with the mouthpiece opening along an X-axis, a first side opening in one side of the housing, and a second side opening in an opposite side of the housing aligned with the first side opening along a Y-axis and perpendicular to the X-axis. The device further comprises a first sliding member movable within the housing having a first air passage formed therethrough parallel to the X-axis and further having an outer end extending through the first side opening. The device further comprises a second sliding member movable within the housing having a first air passage formed therethrough parallel to the X-axis and further having an outer end extending through the second side opening.

The first sliding member is connectable to the second sliding member by a biasing means having a relaxed state and a tension state. The first and second sliding members have a separated position when the biasing means is in the relaxed state in which the first and second air passages are unaligned with each other and with the mouthpiece and air exit openings. The first and second sliding members have a rectangular position when the biasing means is in the tension state in which the first and second air passages are aligned with each other and with the mouthpiece and air exit openings.

When the training device is inserted in a wind player's mouth with the first and second sliding members in the separated position and the outer ends of the first and second sliding members placed against the sides of the player's mouth, air blown from the player's mouth is prevented from flowing through the mouthpiece opening, the first and second air passages, and the air exit opening. When the player tightens the orbicularis oris muscle against the outer ends of the first and second sliding members, the first and second sliding members move from the separated position to the rectangular position and air blown from the player's mouth flows through the mouthpiece opening, the first and second air passages, and the air exit opening.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1A:
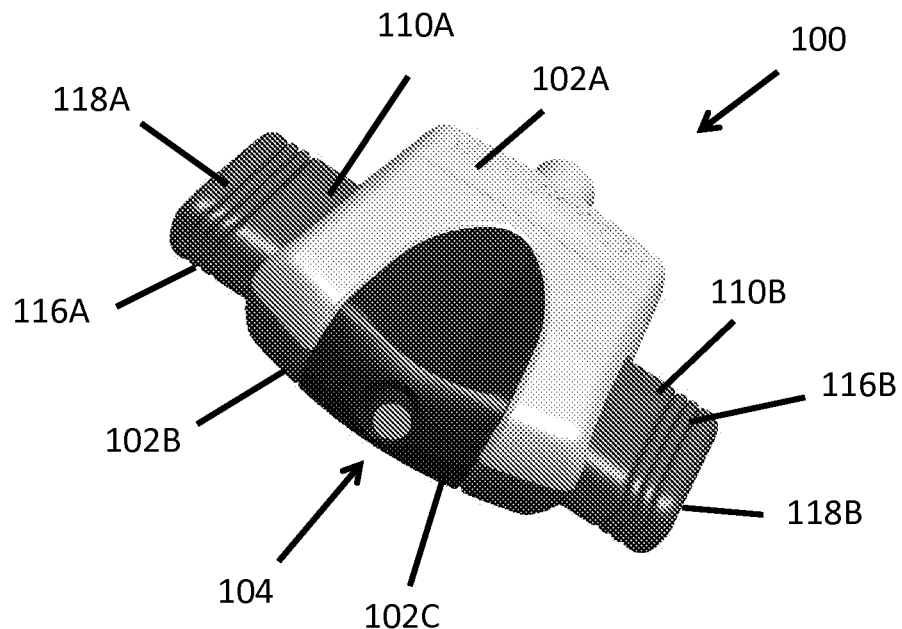
FIGS. 1A and 1B are front and back end perspective views of an embodiment of a wind training device of the present invention.
Figure 1B:
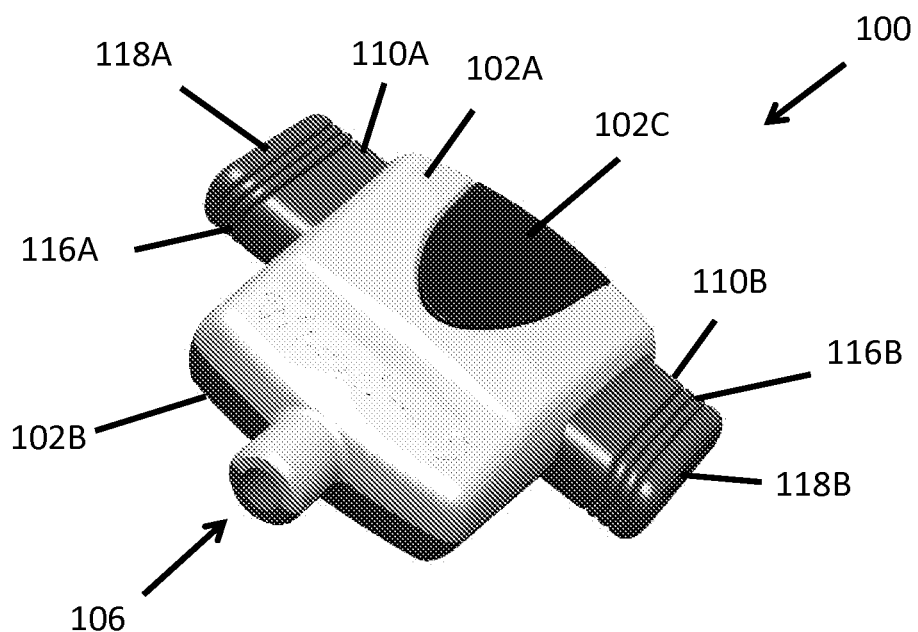

An embodiment of a device 100 to help train and strengthen the muscles of the mouth used by a wind instrument musician is illustrated in the FIGS. The device 100 includes a housing 102 and two sliding members 110A, 110B (FIGS. 1A, 1B). The housing 102 also includes a mouthpiece opening 104 in the front and an air exit opening 106 in the back of the device 100. To use, the musician places the front of the device 100 in his or her mouth with the outer sides of the sliding members 110A, 110B against the sides of the mouth opening. Then, while attempting to blow air into the mouthpiece opening 104, the musician tightens the orbicularis orbis and buccinators muscles to press the sliding members 110A, 110B inward against tension from both sides. When the sliding members 110A, 110B have been pressed inward a sufficient amount, air may pass completely through the device 100, into the mouthpiece opening 104 and out of the air exit opening 106. The process of tightening the muscles of the mouth to press inward on the sliding members 110A, 110B helps strengthen and train those muscles and helps the musician achieve the proper embouchure.

Figure 2A:
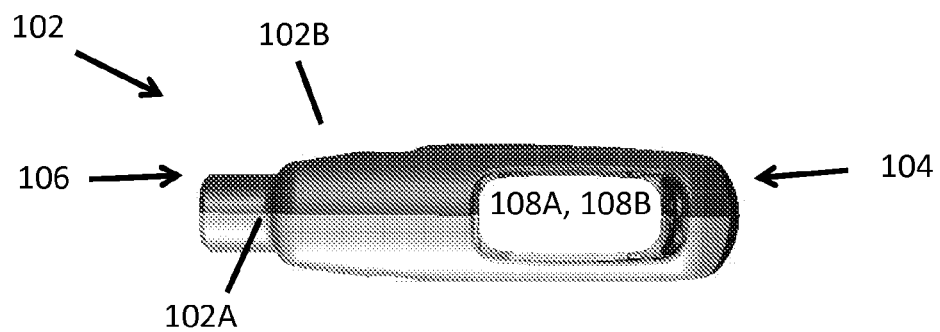
FIG. 2A is a side view of a housing of the wind training device of FIGS. 1A and 1B.
Figure 2B:
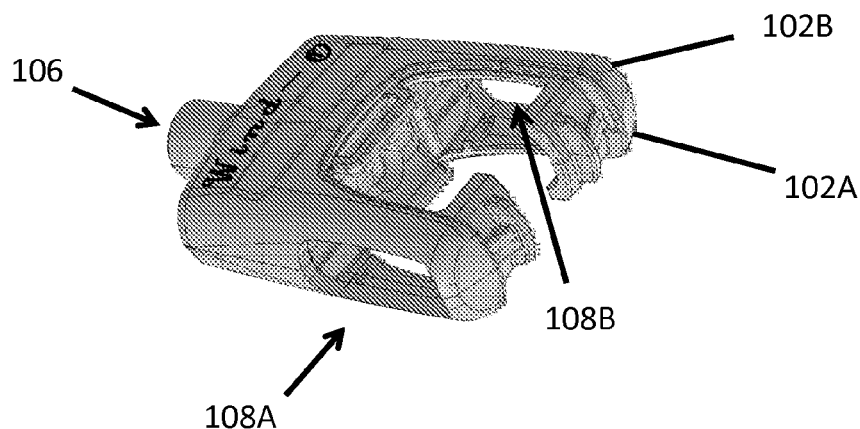
FIG. 2B is a front end perspective view of the housing of FIG. 2A.
Figure 2C:
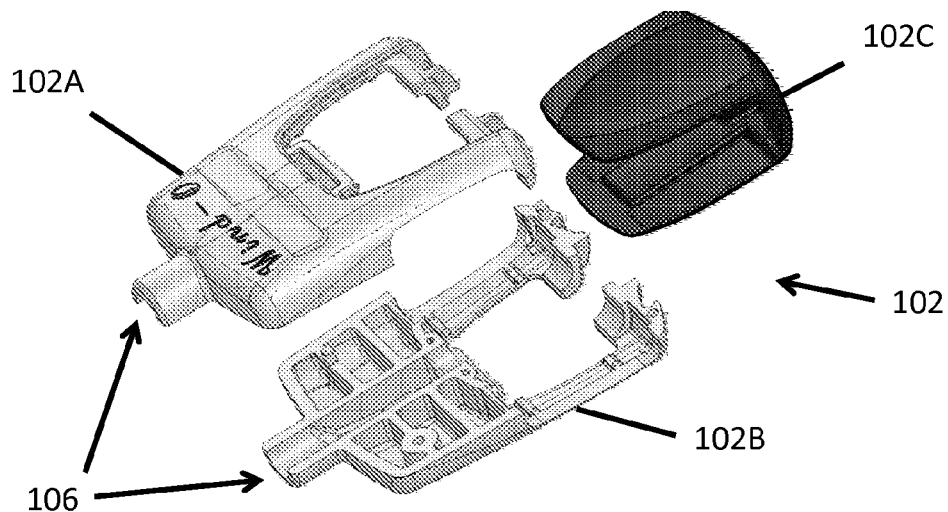
FIG. 2C is an exploded view of the housing of FIG. 2A.
Figures 3A, 3B:
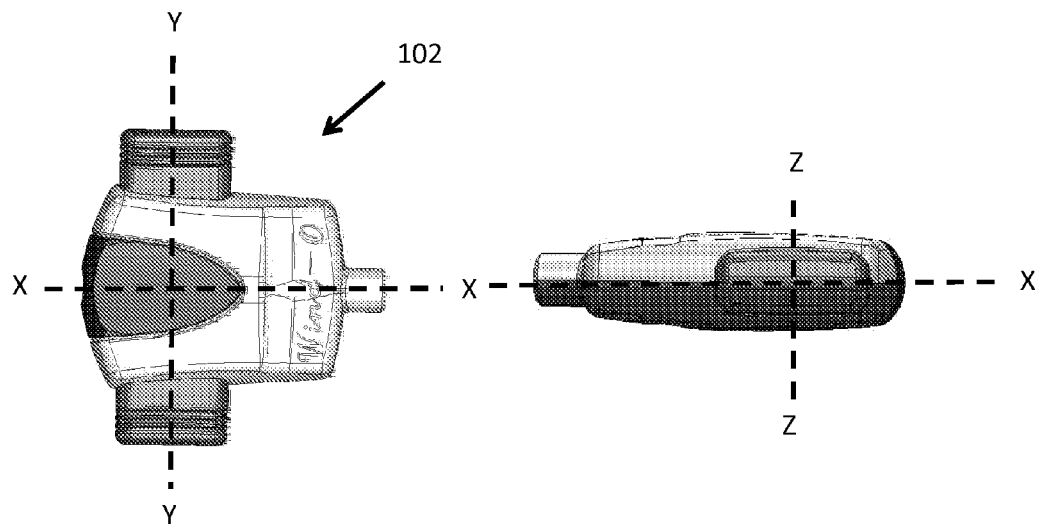
FIGS. 3A and 3B are top and side views of the training device of FIGS. 1A and 1B.

In the embodiment illustrated, the housing 102 includes two half sections 102A and 102B and a removable front section 102C (FIG. 2C) although it will be appreciated that the housing 102 may be fabricated with different sections. The mouthpiece opening 104 is formed in the front section 102C and the air exit opening 106 is formed by half-openings in the two half sections 102A, 102B. The two openings 104, 106 extend along a central X-axis (FIGS. 3A, 3B). The housing 102 also includes two side openings 108A, 108B (FIGS. 2A, 2B) along a Y-axis (FIG. 3A) through which outer ends of the sliding members 110A, 110B extend.

Figure 4A:
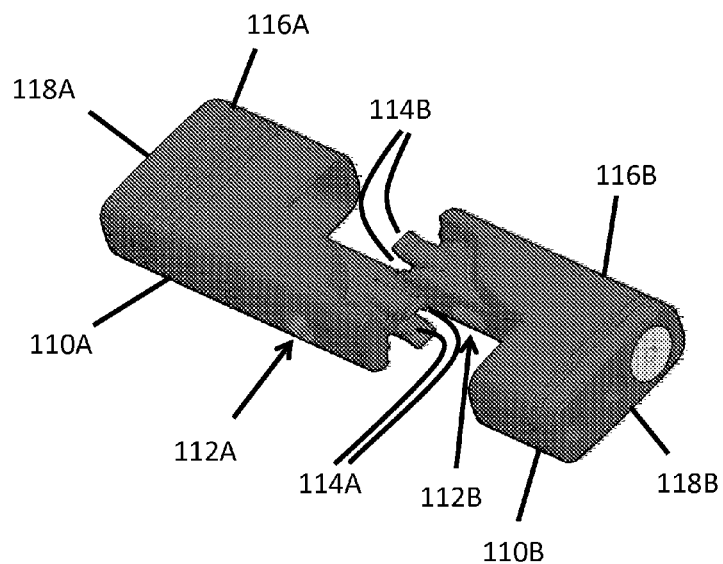
FIG. 4A is a perspective view of sliding members of the training device of FIGS. 1A and 1B.
Figure 4B:
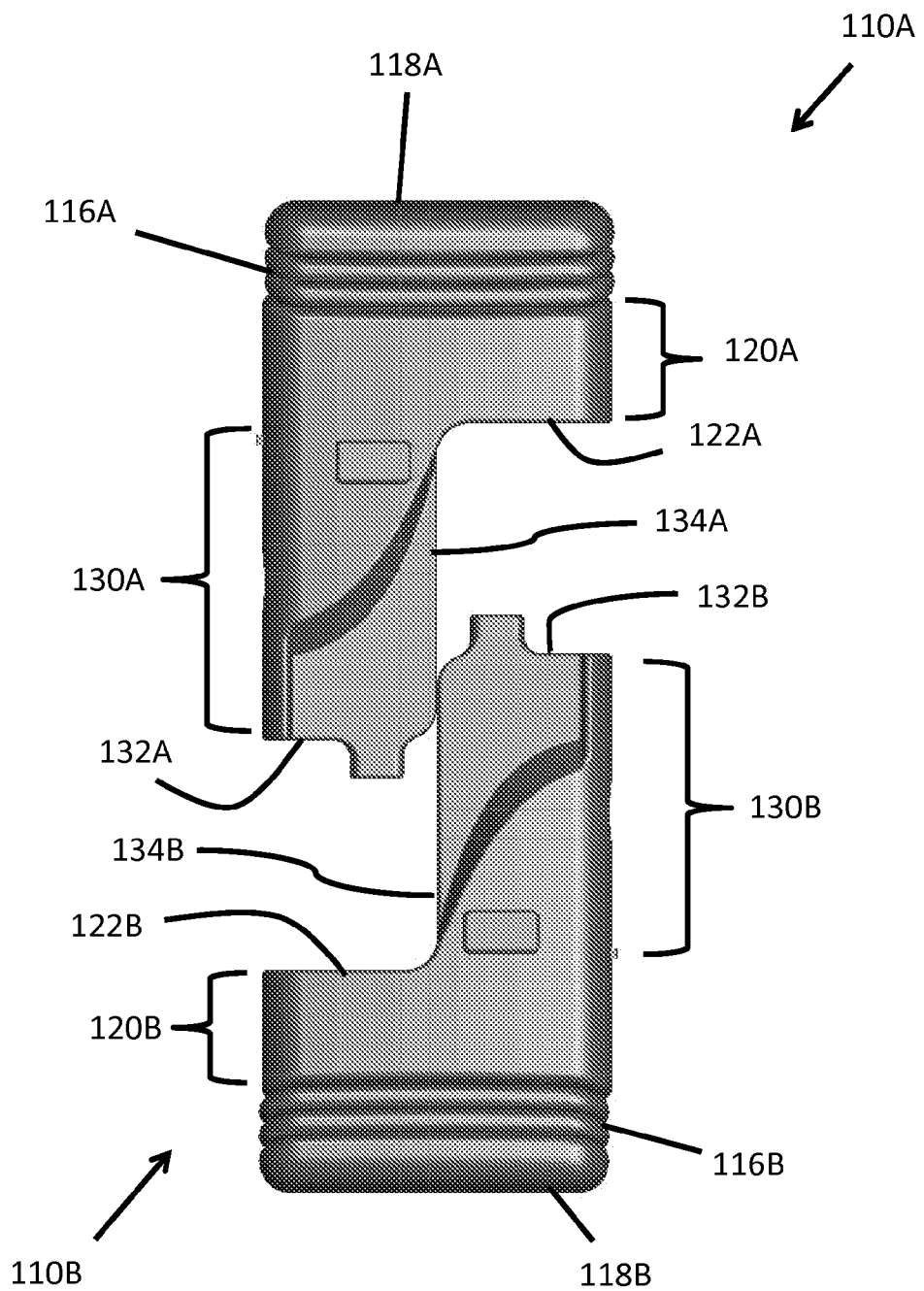
FIG. 4B is a top view of the sliding members of the training device of FIGS. 1A and 1B.
Figure 5A:
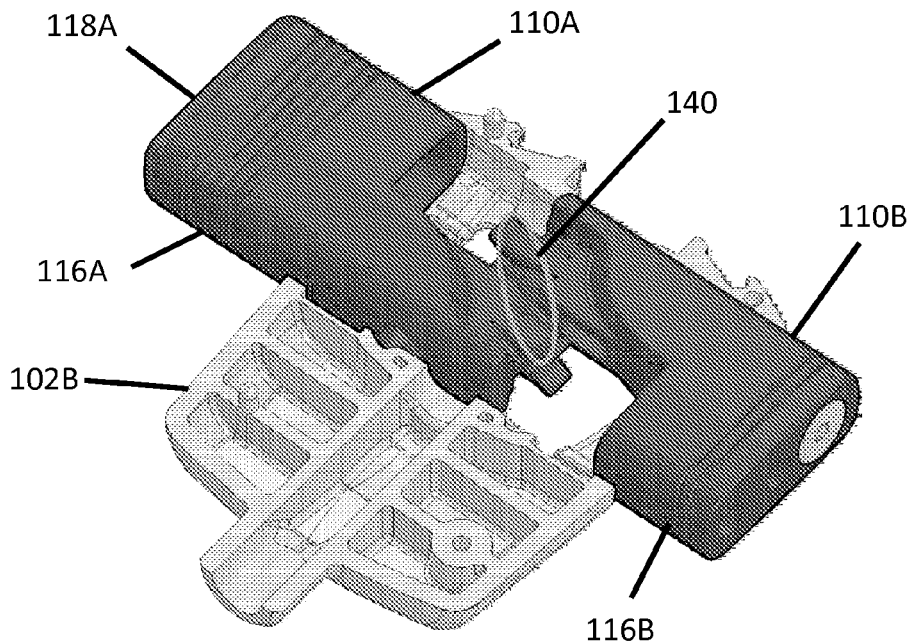
FIGS. 5A and 5B are cut-away perspective views of the training device of FIGS. 1A and 1B in separated and rectangular positions, respectively.
Figure 5B:
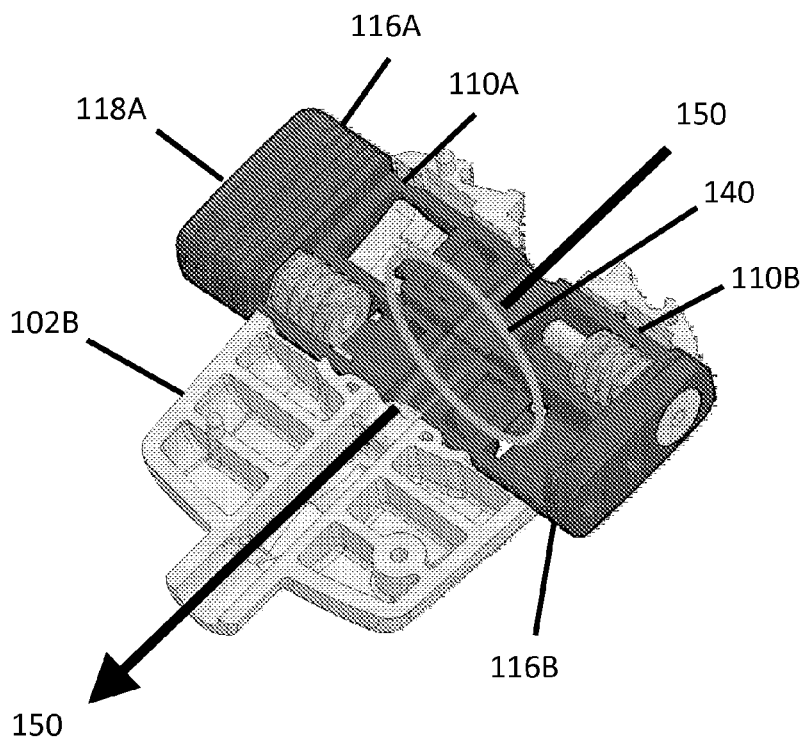

In the embodiment illustrated, the sliding members 110A, 110B both have an approximate L-shape (FIGS. 4A, 4B) and are arranged within the housing 102 to slide together from a separated position (FIG. 5A) to a rectangular position (FIG. 5B). Referring to FIG. 4B, both sliding members 110A, 110B have a wide base section 120A, 120B and a narrower extended section 130A, 130B, extending inward parallel to the Y-axis. Together, the base section and the extended section of a sliding member form an L-shape. The base sections 120A, 120B have an inner-facing end 122A, 122B. The extended sections 130A, 130B have an inner-facing end 132A, 132B and sliding surface 134A, 134B that face each other when the sliding members 110A, 110B are in the rectangular position.

Both of the sliding members 110A, 110B have an air passage 112A, 112B, respectively, formed therethrough parallel to the X-axis (FIG. 4A). In the embodiment illustrated, the sliding members 110A, 110B are L-shaped. When the sliding members 110A, 110B are in the separated position, the two air passages are unaligned (FIG. 5A) and the passage of air is blocked. When the sliding members 110A, 110B are slid together into a rectangular position (FIG. 5B), their respective air passages 112A, 112B become aligned along the X-axis with each other and with the mouthpiece and the air exit openings 104, 106. This alignment allows air to pass through the device 100 as indicated by the arrow 150 (FIG. 5B).

The sliding members 110A, 110B may each have upper and lower knobs 114A, 114B (FIG. 4A) on the inner-facing end 132A, 132B of the extended sections 130A, 130B extending parallel to a Z-axis (perpendicular to both the X- and Y-axes shown in FIG. 3B). An elastic band 140 may connect the two upper tabs and another elastic band (not shown) may connect the two lower tabs. It will be appreciated that other biasing means, such as springs or metal tension strips, for example, may be used to provide a bias between the two sliding members 110A, 110B that requires an opposing force to slide the sliding members 110A, 110B into the rectangular position. The front section 102C may be removed from the rest of the housing 102 in order to attach and remove the elastic bands 140 from the knobs on the sliding members 110A, 110B. Elastic bands of different strengths may be used to require more or less effort to bring the sliding members 110A, 110B together.

FIGS. 5A and 5B illustrate the training device 100 with one of the half sections 102A removed to expose the sliding members 110A, 110B. In FIG. 5A, the sliding members are shown in a first, separated (relaxed) position with their inner facing ends 132A, 132B separated and their respective air passages 112A, 112B unaligned. After the musician places the device 100 in his or her mouth with the outer ends of the sliding members 110A, 110B against the sides of the mouth opening, he or she tightens the orbicularis orbis and buccinators muscles against the bias of the elastic bands 140 to press the sliding members 110A, 110B inward from both sides, with their respective sliding surfaces sliding against each other, into their rectangular position. When the sliding members 110A, 110B have been pressed inward a sufficient amount, as illustrated in FIG. 5B, the mouthpiece opening 104, both air passages 112A, 112B, and the air exit opening 106 become aligned along the X-axis and air may pass through the device 100 along a path indicated by the arrow 150. When the muscles are relaxed, the sliding members 110A, 110B are forced apart by the bias of the elastic band 140 back into their separated position.

Figure 6A:
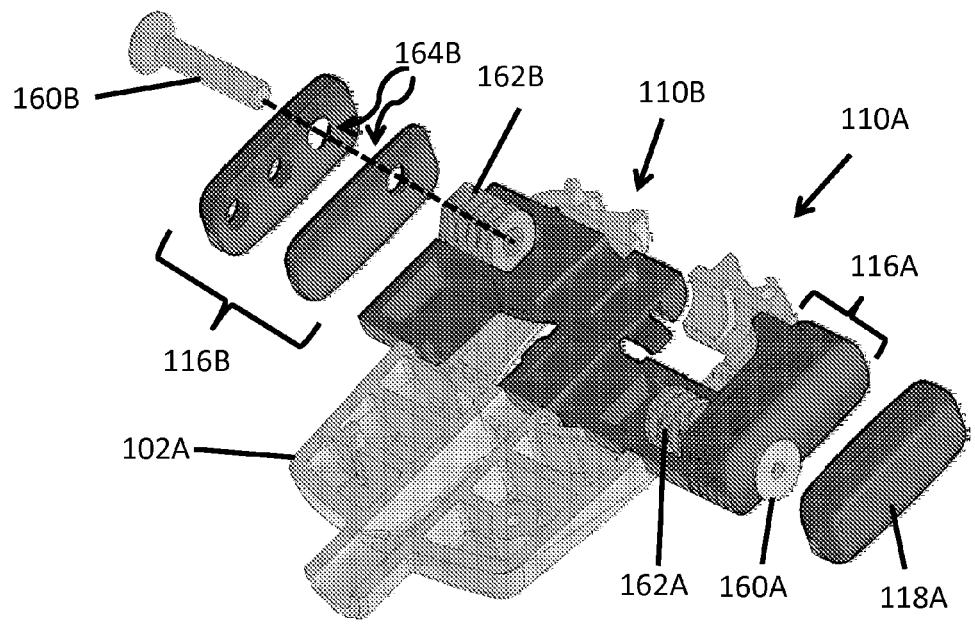
FIG. 6A is an exploded view of a portion of the training device of FIGS. 1A and 1B illustrating one method to secure the cheek pads and shims to the sliding members.

Because the width of people's mouths may vary, one or more shims 116A, 116B may be secured to the outer sides of the sliding members 110A, 110B. Cheek pads 118A, 118B may also be secured, either directly to the outer ends of the sliding members 110A, 110B or to the shims 116A, 116B. FIG. 6A illustrates one method for securing shims 116A, 116B and cheek pads 118A (not shown in FIG. 6A but shown in the previous FIGS.), 118B to the outer surfaces of the sliding members 110A, 110B. In FIG. 6A, a single shim 116B and cheek pad 118B are illustrated in an exploded view. A counter-sunk head cap bolt 160B fits through openings 164B in the shims 116B and is screwed into a nut 162B secured within the sliding member 110B. A cheek pad (not shown in FIG. 6A) having two short posts that fit into corresponding openings in the outer shim 116B may then be snapped over the outer shim 116B. The other side of the device in FIG. 6A illustrates a set of several shims 116A secured with a head cap bolt 160A screwed into a nut 162A. The cheek pad 118A, with two short posts, may then be snapped onto the outermost shim 116A, with two corresponding openings. For typical use, both sliding members 110A, 110B will have the same number of shims 116 attached; a different number of shims 116A, 116B are shown on the two sides for illustrative purposes.

Figure 6B:
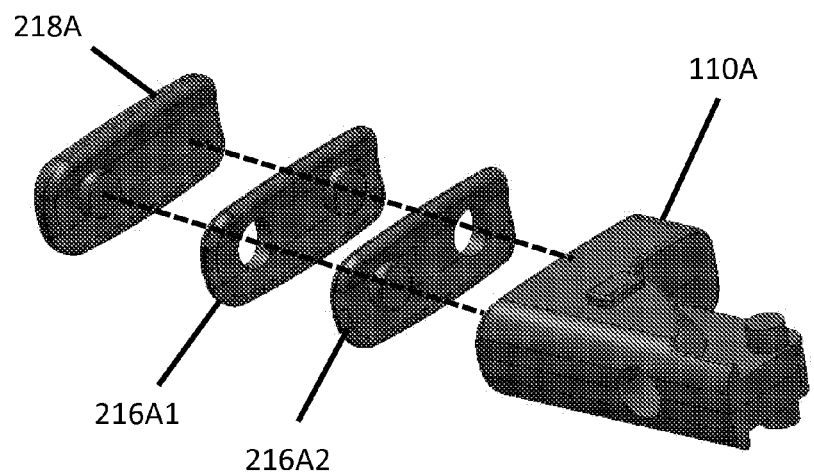
FIG. 6B is an exploded view of the training device of FIGS. 1A and 1B illustrating an alternative method to secure a cheek pad and shims to a sliding member.

FIG. 6B illustrates an alternative method for securing shims 216A1, 216A2 and the cheek pad 218A to the outer surface of one of the sliding members 110A. A short post extending from an inner side at one end of a shim 216A1 snaps into a hole in an opposite end of another shim 216A2 or into a hole in the outer end of the sliding member 110A. The cheek pad 218A may similarly snap onto the outermost shim 2316A1. It will be appreciated that other methods may be used to secure the shims and cheek pads to the sliding members 110A, 110B.

Figure 7A:
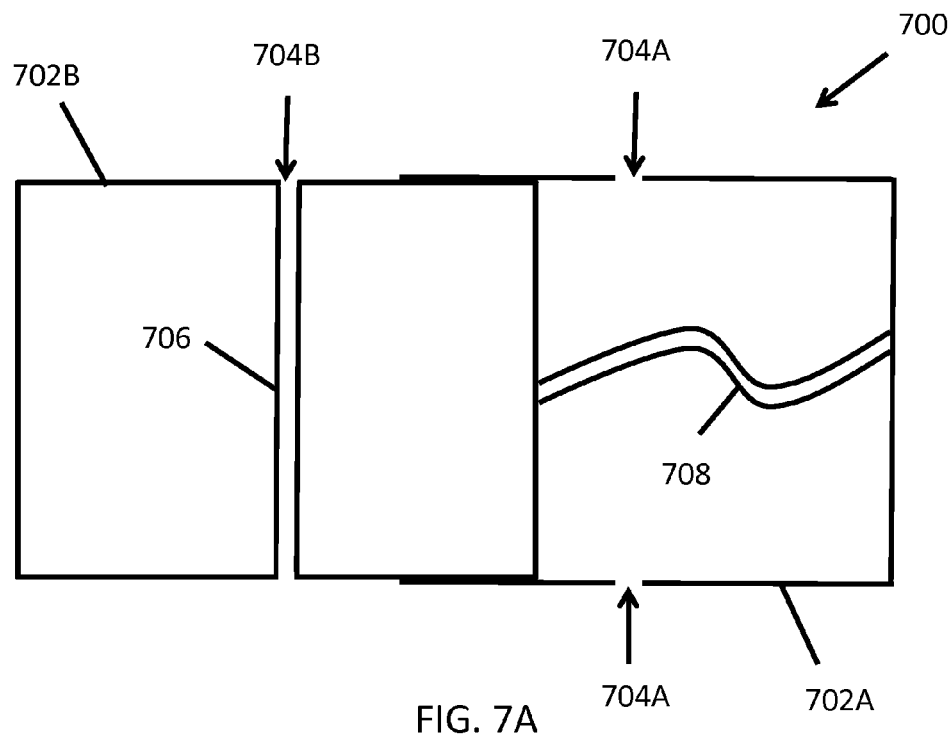
FIGS. 7A and 7B are cut-away illustrations of another embodiment of a wind training device of the present invention in first and second positions, respectively.
Figure 7B:
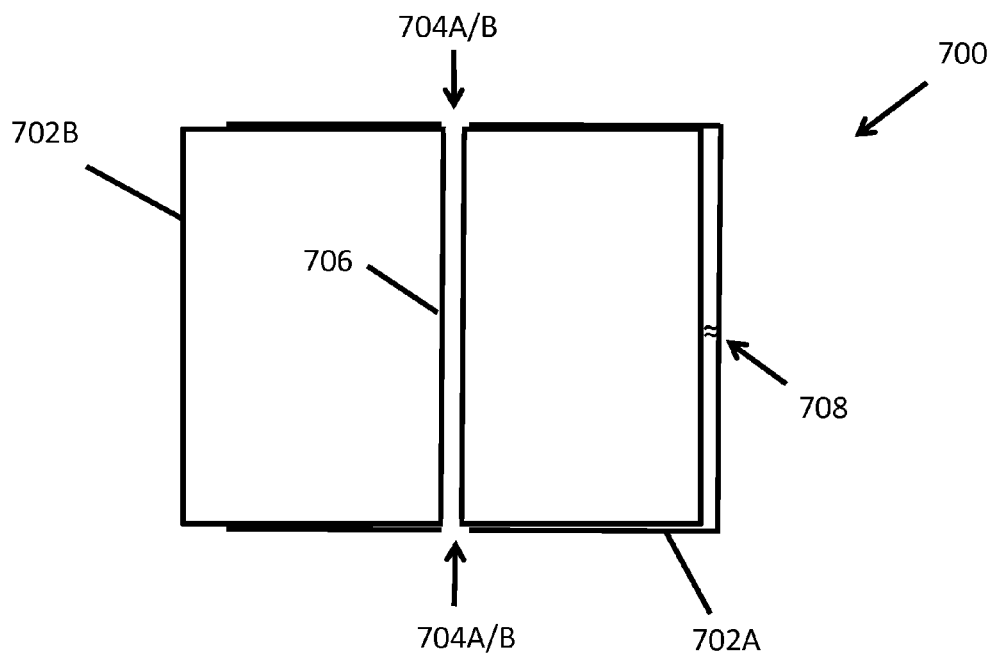

In another embodiment of a wind training device 700 of the present invention, illustrated in FIGS. 7A and 7B, a first of two sliding members within a housing (not shown) may be a rectangular shell 702A with one end open and have air passage openings 704A in its front and back walls. The second sliding member may a closed rectangular shell 702B, slightly small in the X and Z dimensions (width and height) than the first sliding member 702A to fit within the first sliding member. The second sliding member 702B may have air passage openings 704B in its front and back walls. A tube 706 through the inside of the second sliding member 702B may connect the two air passage openings 704B of the second sliding member 702B. A biasing means 708, such as one or more compression springs, between the two sliding members 702A, 702B within the hollow inside of the first sliding member 702A, may provide the tension against which the wind player presses in order to align the air passages 704A, 704B in the two sliding members 702A, 702B with each other and with the mouthpiece opening and the air exit opening in the housing. When the two sliding members 702A, 702B are in a first position (FIG. 7A), with the biasing means 708 in a relaxed state, the air passages 704A, 704B are unaligned and air from the player's mouth cannot pass from the mouthpiece opening in the housing through to the air exit opening. When the sliding members 702A, 702B have been pressed inward a sufficient amount, the mouthpiece opening, both air passages 704A, 704B, and the air exit opening become aligned (FIG. 7B) and air may pass through the device.

The description of the present invention has been presented for purposes of illustration and description, but is not intended to be exhaustive or limited to the embodiment in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A wind instrument training device, comprising:
   a housing having a mouthpiece opening in one end, an air exit opening in an opposite end aligned with the mouthpiece opening along an X-axis, a first side opening in one side of the housing, and a second side opening in an opposite side of the housing aligned with the first side opening along a Y-axis perpendicular to the X-axis;
   a first sliding member movable within the housing having a first air passage formed therethrough parallel to the X-axis and further having an outer end extending through the first side opening; and
   a second sliding member movable within the housing having a first air passage formed therethrough parallel to the X-axis and further having an outer end extending through the second side opening;
   the first sliding member being connectable to the second sliding member by a biasing means having a relaxed state and a tension state;
   the first and second sliding members having a separated position when the biasing means is in the relaxed state in which the first and second air passages are unaligned with each other and with the mouthpiece and air exit openings; and
   the first and second sliding members having a rectangular position when the biasing means is in the tension state in which the first and second air passages are aligned with each other and with the mouthpiece and air exit openings along the X-axis;
   whereby, when the training device is inserted in a wind player's mouth with the first and second sliding members in the separated state and the outer ends of the first and second sliding members placed against the sides of the player's mouth, air blown from the player's mouth is prevented from flowing through the mouthpiece opening, the first and second air passages, and the air exit opening; and
   whereby, when the wind player tightens the orbicularis oris muscle against the outer ends of the first and second sliding members, the first and second sliding members move from the separated position to the rectangular position and air blown from the player's mouth flows through the mouthpiece opening, the first and second air passages, and the air exit opening.

2. The training device of claim 1, wherein the biasing means comprises an elastic band stretched between tabs extending from the first and second sliding members substantially parallel to a Y-axis.

3. The training device of claim 1, wherein the housing comprises:
   a first half portion;
   a second half portion; and
   a removable front portion covering a front end of the training device and through which the mouthpiece opening is formed.

4. The training device of claim 1, further comprising at least one shim securable to each outer end of the first and second sliding members.

5. The training device of claim 1, further comprising a cheek pad securable to the outer ends of the first and second sliding members.

6. The training device of claim 1, further comprising:
   a shim securable to outer ends of the first and second sliding members; and
   a cheek pad securable to outer ends of the shims.

7. The training device of claim 1, wherein each sliding member is substantially L-shaped and comprises:
   a base section, comprising a first inner-facing end; and
   an extended section, narrower than the base section and extending inward from the base section parallel to the Y-axis, comprising:
   a second inner-facing end; and
   a sliding surface;
   wherein:
   the sliding surfaces of the first and second sliding members slide against each other when the first and second sliding members move from the separated position to the rectangular position; and
   the second inner-facing end of the extended section of each sliding member abuts the first inner-facing end of the base section of the other sliding member when the first and second sliding members are in the rectangular position.

* * * * *